US012677748B2

(12) United States Patent
Créscio et al.

(10) Patent No.: US 12,677,748 B2
(45) Date of Patent: Jul. 14, 2026

(54) MECHANICAL ARRANGEMENT INTRODUCED IN A GRAIN COLLECTING AND PROCESSING MACHINE

(71) Applicant: Indústrias Colombo S.A., Pindorama (BR)

(72) Inventors: Alexandre Aparecido Créscio, Pindorama (BR); Oswaldo Argeu Leite, Catanduva (BR)

(73) Assignee: INDÚSTRIAS COLOMBO S.A., Pindorama-SP (BR)

( * ) Notice: Subject to any disclaimer, the term of this patent is extended or adjusted under 35 U.S.C. 154(b) by 933 days.

(21) Appl. No.: 17/898,908

(22) Filed: Aug. 30, 2022

(65) Prior Publication Data

US 2023/0284564 A1 Sep. 14, 2023

(30) Foreign Application Priority Data

Mar. 8, 2022 (BR) .......................... 102022004278-0

(51) Int. Cl.
| | |
|---|---|
| *A01F 12/44* | (2006.01) |
| *A01D 45/22* | (2006.01) |
| *A01F 12/56* | (2006.01) |
| *A01D 29/00* | (2006.01) |
| *A01D 41/04* | (2006.01) |

(52) U.S. Cl.
CPC .............. *A01F 12/44* (2013.01); *A01D 45/22* (2013.01); *A01F 12/56* (2013.01); *A01D 29/00* (2013.01); *A01D 41/04* (2013.01)

(58) Field of Classification Search
CPC ........ A01D 29/00; A01D 45/00–45/30; A01D 41/04; A01F 7/00–7/70; A01F 12/00–12/60
See application file for complete search history.

(56) References Cited

U.S. PATENT DOCUMENTS

| | | | | |
|---|---|---|---|---|
| 4,136,507 A | * | 1/1979 | Hobbs | A01D 29/00 56/364 |
| 5,138,826 A | * | 8/1992 | Hobbs | A01D 29/00 460/13 |
| 5,355,971 A | * | 10/1994 | Austin | B60K 25/06 180/53.3 |
| 7,908,835 B2 | | 3/2011 | Bertino | |
| 11,178,820 B2 | * | 11/2021 | Bertino | A01D 41/04 |
| 2002/0151336 A1 | * | 10/2002 | McLeod | B07B 13/08 460/12 |
| 2008/0295475 A1 | * | 12/2008 | Boyko | A01D 34/86 56/15.8 |
| 2008/0295476 A1 | * | 12/2008 | Bertino | A01D 41/00 56/14.7 |

(Continued)

*Primary Examiner* — Joseph M Rocca
*Assistant Examiner* — Madeline I Runco
(74) *Attorney, Agent, or Firm* — B. Aaron Schulman, Esq.; Stites & Harbison, PLLC

(57) ABSTRACT

A mechanical arrangement introduced into a grain collecting and processing machine using a hinged traction bar is provided, wherein two swivel gearboxes are installed, allowing the head to be assembled in the center and the machine to work laterally displaced over the tractor vehicle, on both sides, thus facilitating both the operation and the collection process. A grain collecting and processing machine including the mechanical arrangement is also provided.

10 Claims, 6 Drawing Sheets

(56) References Cited

U.S. PATENT DOCUMENTS

| | | | |
|---|---|---|---|
| 2013/0102369 A1* | 4/2013 | Johnson | A01D 41/127 |
| | | | 56/122 |
| 2016/0316626 A1* | 11/2016 | Bertino | A01D 29/00 |
| 2018/0263198 A1* | 9/2018 | Bertino | A01B 69/008 |
| 2019/0183051 A1* | 6/2019 | Matsuo | A01D 51/002 |
| 2020/0068780 A1* | 3/2020 | Anderson | A01B 59/002 |
| 2020/0236855 A1* | 7/2020 | Bertino | A01D 69/002 |
| 2022/0242179 A1* | 8/2022 | Hofmann | A01B 59/042 |

* cited by examiner

1

1

MECHANICAL ARRANGEMENT INTRODUCED IN A GRAIN COLLECTING AND PROCESSING MACHINE

FIELD OF THE INVENTION

A mechanical arrangement introduced in a grain collecting and processing machine, having subarrangements collecting the plots and guiding them to the systems for tracking, cleaning and separating the harvested product.

BACKGROUND OF THE INVENTION

Various grain collecting and processing machines are already known in the current state of the art, e. g. of the type as disclosed by the patent BR 0702108-9, herewith incorporated as reference.

The machines used for collecting beans have particularities, one of which highlights their need to work displaced from the tractor, since the distance between the plots avoids the tractor from passing through the same line of the machine, otherwise said tractor would pass over the plots, since, when the beans are cut, two very close plots are prepared, with a larger space between each pair of plots. The tractor may pass through that space, harvesting both plots located on each one of its sides.

Since the machines need to work in a displaced position, there are currently various machines working in this fashion. However, when the head is displaced from the machine, the activating cardans are overloaded, causing premature wearing and excessive vibrations to the equipment. Besides, in the currently known machines, the head is displaced only on one side, thus limiting the operation and harvesting proceedings.

Another particularity of bean harvesting is that the straw remaining from the tracking procedure must be chopped and spread, so to provide a straw cover over the soil which is as evenly spread as possible, not disturbing the seeding of other cultures after beans are harvested.

The currently existing choppers to chop and spread out the straw work with a vertical shaft, which reduces the working life of the lower roller for accumulating impurities. They are also inefficient while spreading impurities to the ground, since the material is not fully chopped. Furthermore, the chopper roller, when vertically assembled, clogs the outlet for part of the chopped material, while the expelled portion is irregularly spread over the soil, disturbing the following crops.

Harvesting beans also requires the use of a larger machine, provided with two beater drums, which consequently requires a larger vibrating case.

Vibrating cases as currently used in larger-sized equipments are built in a single part, being thus heavy and, since they work disclosing an alternate linear movement, to separate beans from impurities, they generate excessive vibrations, wearing their parts and causing discomfort to the operator.

It is therefore an object of the invention to present improvements in the equipment to meet and overcome the deficiencies of the current state of the art, so to:
    allow the displaced work of the machine on both sides, not damaging the cardans;
    provide the straw chopper with better performance;
    allow more even spreading of the straw over the soil;

allow the work of the machine with less vibration; and provide better comfort to the operator.

SUMMARY OF THE INVENTION

To reach the objects proposed by the invention, a hinged traction bar is used, wherein two swivel gearboxes are installed, allowing the head to be assembled in the center and the machine to work laterally displaced over the tractor vehicle, on both sides, thus facilitating both the operation and the collection process.

The arrangement, between said swivel gearboxes, of an intermediate gearbox is also included, so to allow to change the rotation of the gearboxes activating beater drums, to improve their operational efficiency, thus reducing lost and broken grains in different climate conditions, and with different varieties of beans.

The change of rotation of the beater drums may optionally be performed by the central gearbox, located after the rear swivel gearbox, thus eliminating the intermediate gearbox.

The horizontal arrangement of the straw chopper is also included, coinciding with the flow of vegetal mass inside the machine, thus improving its performance to chop the straw and potentializing the outlet flow of the chopped material, for increasing its rotation in service. Fins are also installed on the rear part of said chopper, so to help in spreading the chopped material, allowing for more even deposition over the soil, improving its coverage and facilitating subsequent seeding procedures.

A vibrating case is also used with two separate vibrators, one for each beater drum, working individually and assembled out of phase from each other; i. e. while one is fully ahead, the other one is fully behind, so to neutralize machine vibration while in service.

DETAILED DESCRIPTION OF THE INVENTION

Figure 1:
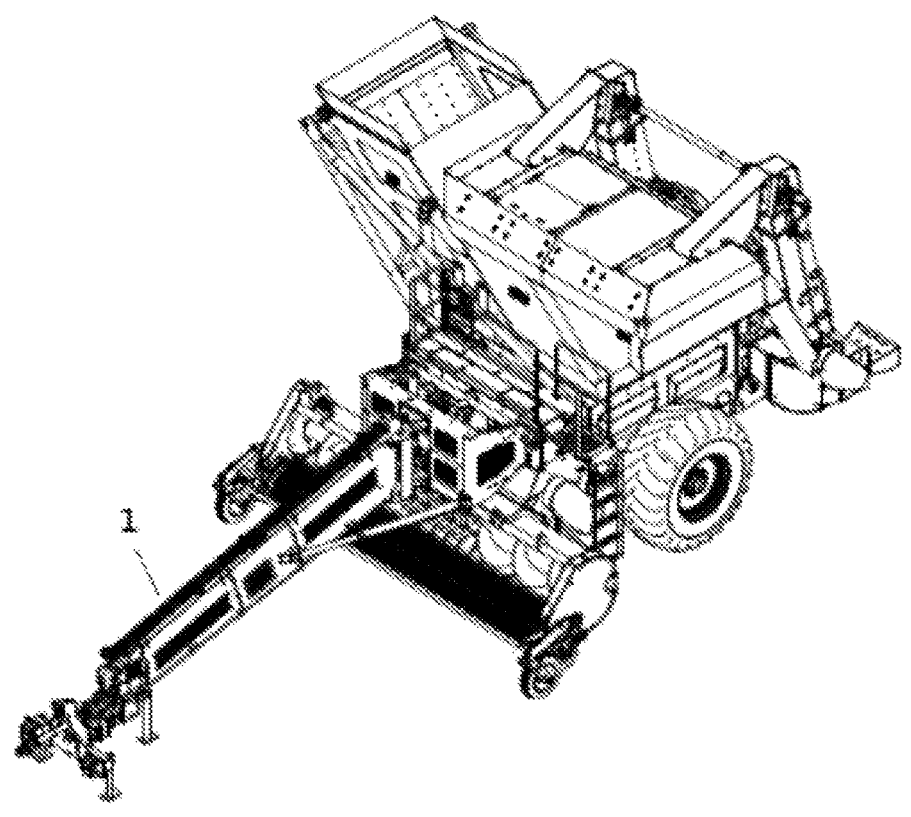
FIG. 1 shows a front perspective view of a grain collecting and processing machine incorporating the constructive arrangement of the invention.
Figure 2:
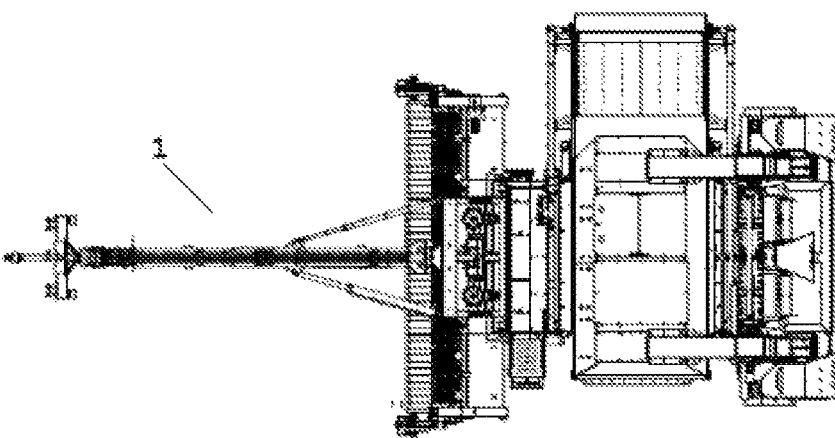
FIG. 2 shows an upper view of a grain collecting and processing machine incorporating the constructive arrangement of the invention, with the traction bar in a centered position.
Figure 3:
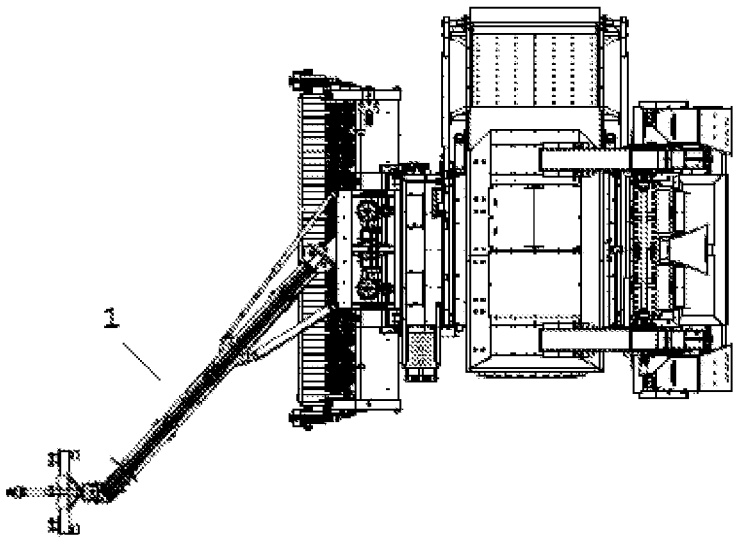
FIG. 3 shows an upper view of a grain collecting and processing machine, incorporating the constructive arrangement of the invention, with the traction bar on the right side.
Figure 4:
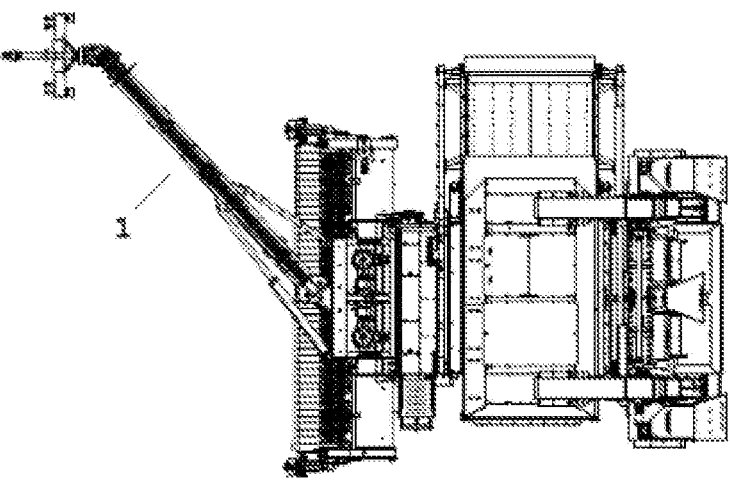
FIG. 4 shows an upper view of a grain collecting and processing machine incorporating the constructive arrangement of the invention, with the traction bar on the left side.
Figure 5:
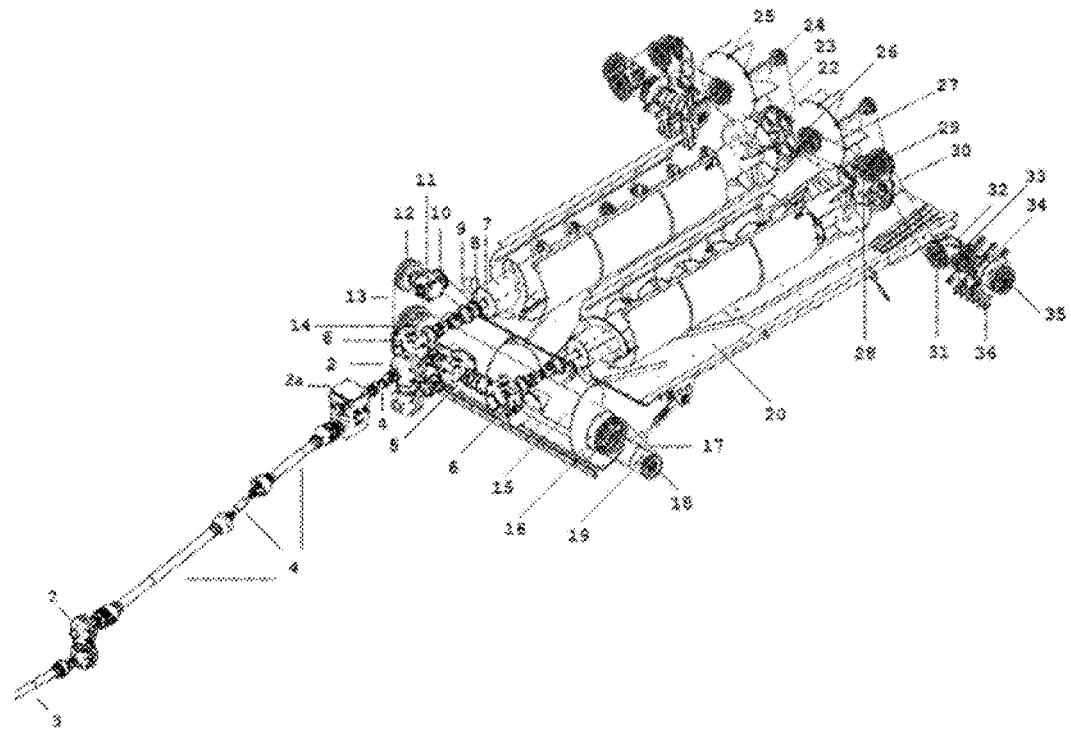
FIG. 5 shows an upper perspective view of the activation system of a grain collecting and processing machine, incorporating the constructive arrangement of the invention.
Figure 6:
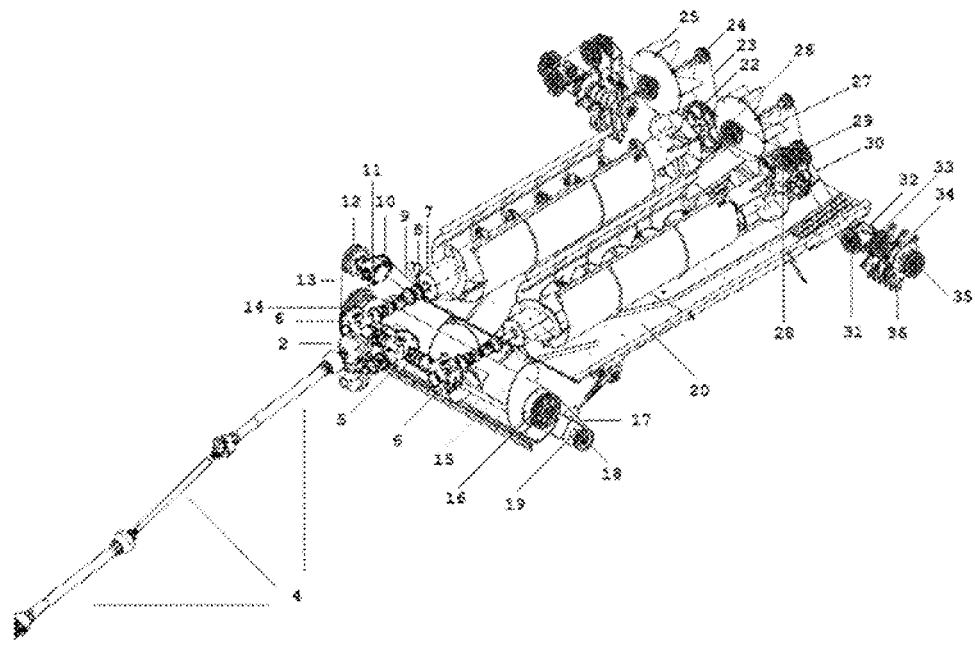
FIG. 6 shows an upper perspective view of the activation system of a grain collecting and processing machine incorporating the constructive arrangement of the invention, without the intermediate gearbox.
Figure 7:
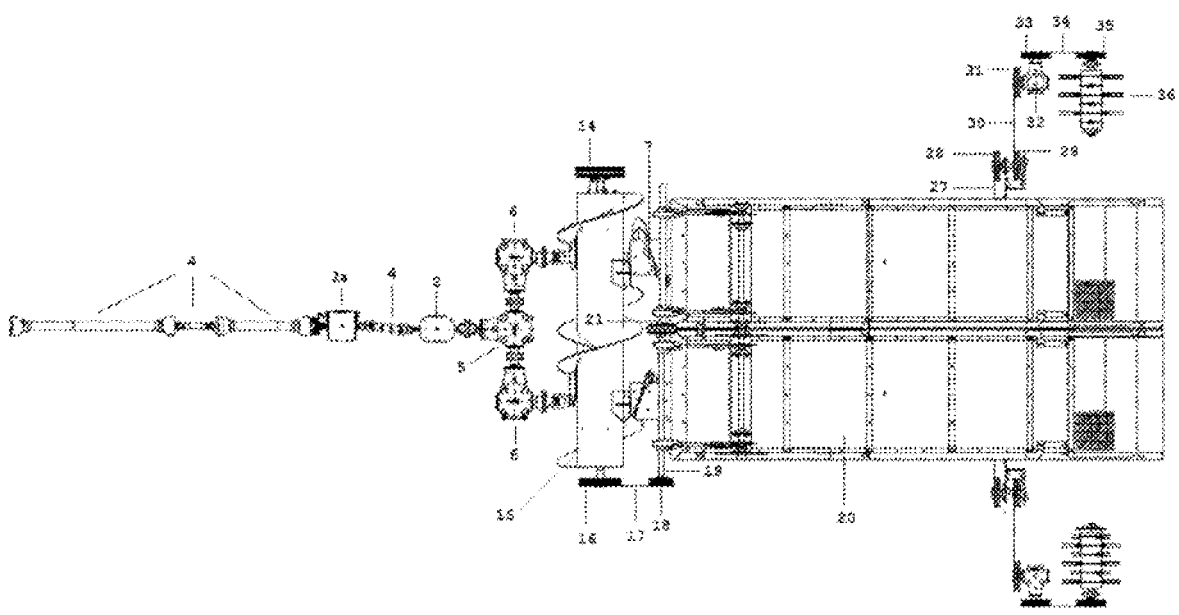
FIG. 7 shows a lower perspective view of the activation system of a grain collecting and processing machine, incorporating the constructive arrangement of the invention.
Figure 8:
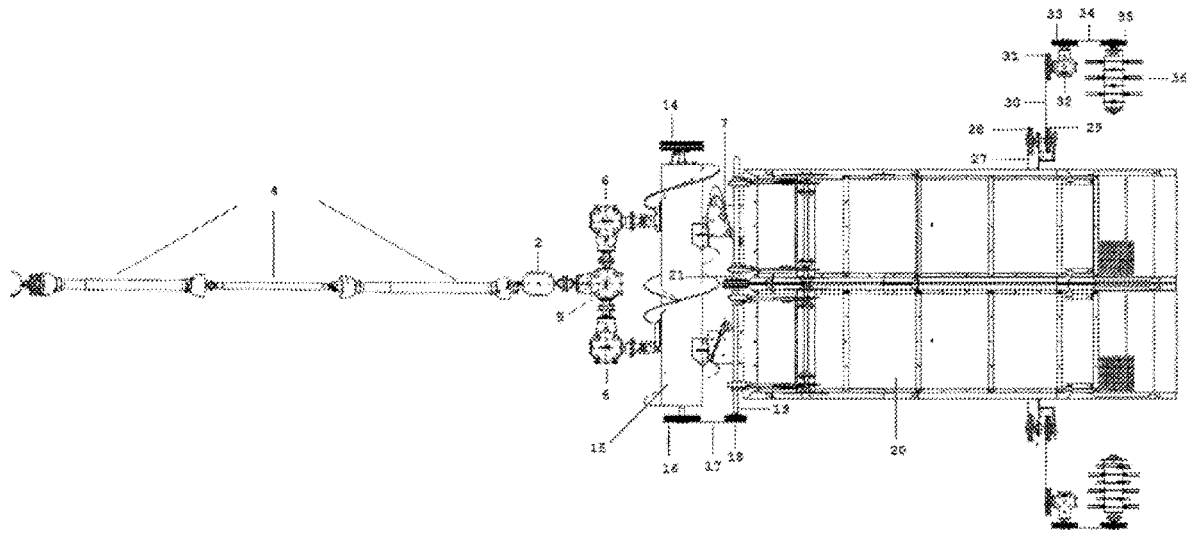
FIG. 8 shows a lower perspective view of the activation system of a grain collecting and processing machine incorporating the constructive arrangement of the invention, without the intermediate gearbox.

As shown by the attached drawings, the invention incorporates a traction bar (1), to which two swivel gearboxes (2)

are installed, one of which on the front part of the traction bar, after the cardan shaft (3) for coupling to the tractor power outlet (not shown), and the other one on the rear part of the traction bar, allowing the tractor to work displaced over both sides of the arrangement, not overloading the cardan shafts (4) installed between said swivel gearboxes (2), also including, between said swivel gearboxes, an intermediate gearbox (2a), through which it is possible to control the transmitted rotation, by means of the central gearbox (5), located after the rear swivel gearbox, to the gearboxes (6) activating the beater drums (7), for their better efficiency. This rotation control may be optionally performed by the central gearbox (5), making the gearbox (2a) become unnecessary. Another gear (8) is also envisaged, located on the shaft of one of the beater drums which, by means of a chain (9), activates the gear (10) of the gearbox (11), which activates the pulley (12) which, by means of a belt (13), activates the pulley (14) activating the distributor roller (15), on which opposed edge a pulley (16) is designed which, by means of a belt (17), activates the pulley (18) of the front crosswise shaft (19) of the screen arrangement (20), in which central part an eccentric shaft (21) is included, which synchronously promotes the alternate linear movement of said screens, neutralizing the vibrations caused by their displacement. On the rear edges of the beater drums, pulleys (22) are also included, which, by means of belts (23), activate the pulleys (24) of the fans (25), on which front pulleys (26) are designed, which, by means of belts (27), activate the front pulleys (28) of the double pulley arrangements, while the rear pulleys (29) activate, by means of belts (30), the pulleys (31) of the gearboxes (32) transmitting rotation to the pulleys (33) which, by means of belts (34), activate the pulleys (35) rotating horizontally located choppers (36).

What is claimed is:

1. A mechanical arrangement introduced into a grain collecting and processing machine comprising:
   (a) a traction bar, having two opposite sides; a front section and a rear section;
   (b) multiple beater drums;
   (c) an admission roller, having a first edge and a second opposite edge;
   (d) a screen set, having a front crosswise shaft including an eccentric shaft located at a central section;
   (e) multiple fans; and
   (f) multiple choppers;
wherein the traction bar is hinged on the two opposite sides, and comprising:
   a first and a second swivel gearboxes, the first swivel gearbox installed on the front section of the traction bar, after a cardan shaft coupling to a power outlet of a tractor, and the second swivel gearbox installed on the rear section of the traction bar;
   a third intermediate gearbox is installed between the first and the second swivel gearboxes, the intermediate gearbox controlling a rotation transmitted by a fourth central gearbox, located adjacent to the second swivel gearbox installed on the rear section of the traction bar to a fifth gearbox activating the beater drums.

2. The mechanical arrangement of claim 1, wherein the rotation control transmitted to the fifth gearbox activating the beater drums may be optionally performed by the fourth central gearbox, located adjacent to the second swivel gearbox installed on the rear section of the traction bar.

3. The mechanical arrangement of claim 1, further comprising a first gearing, located on a shaft of one of the beater drums, having a chain, transmitting rotation to a second gearing of a sixth gearbox; the sixth gearing transmitting rotation to a first pulley; a belt actuated by the first pulley activates a second pulley; the second pulley activating the admission roller.

4. The mechanical arrangement of claim 1, further comprising a third pulley, located on the second opposite edge of the admission roller, a belt actuated by the third pulley, activates a fourth pulley of a front crosswise shaft of the screen set.

5. A grain collecting and processing machine comprising the mechanical arrangement of claim 1.

6. A mechanical arrangement introduced into a grain collecting and processing machine comprising:
   (a) a traction bar, having two opposite sides; a front section and a rear section;
   (b) multiple beater drums;
   (c) an admission roller, having a first edge and a second opposite edge;
   (d) a screen set having a front crosswise shaft including an eccentric shaft located at a central section;
   (e) multiple fans; and
   (f) multiple choppers;
wherein the eccentric shaft synchronizes an alternated linear movement of the screens, neutralizing vibrations caused by the displacement of the screens.

7. The mechanical arrangement of claim 6, further comprising a first pulley set, located on the rear section of the beater drums; a first set of belts, actuated by a second pulley set of the multiple fans.

8. A grain collecting and processing machine comprising the mechanical arrangement of claim 6.

9. A mechanical arrangement introduced into a grain collecting and processing machine comprising:
   (a) a traction bar, having two opposite sides; a front section and a rear section;
   (b) multiple beater drums;
   (c) an admission roller, having a first edge and a second opposite edge;
   (d) a screen set having a front crosswise shaft including an eccentric shaft located at a central section;
   (e) multiple fans; and
   (f) multiple choppers assembled horizontally;
wherein the multiple fans further comprise a front third pulley set, actuating a second set of belts;
   wherein the second set of belts actuates a front fourth pulley set of a double pulley arrangement;
   wherein a third set of belts actuated by a rear fifth pulley set actuates a sixth pulley set of gearboxes;
   wherein the sixth pulley set transmits rotation to a seventh pulley set, and
   wherein a fourth set of belts actuated by the seventh pulley set actuates an eighth pulley set, rotating the horizontally assembled choppers.

10. A grain collecting and processing machine comprising the mechanical arrangement of claim 9.

* * * * *